United States Patent
Matsuda

(10) Patent No.: US 8,162,119 B2
(45) Date of Patent: Apr. 24, 2012

(54) BACK TORQUE REDUCING DEVICE OF A FRICTION CLUTCH AND MOTORCYCLE COMPRISING THE SAME

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 510 days.

(21) Appl. No.: 12/417,503

(22) Filed: Apr. 2, 2009

(65) Prior Publication Data

US 2009/0260942 A1    Oct. 22, 2009

(30) Foreign Application Priority Data

Apr. 3, 2008    (JP) .................................. 2008-096889

(51) Int. Cl.
*F16D 43/21* (2006.01)
*F16D 13/52* (2006.01)
(52) U.S. Cl. ............... 192/54.52; 192/70.23; 192/110 R
(58) Field of Classification Search ............... 192/54.52, 192/70.23
See application file for complete search history.

(56) References Cited

U.S. PATENT DOCUMENTS

| 7,681,705 B2 * | 3/2010 | Okada et al. ................. 192/54.5 |
| 7,753,186 B2 * | 7/2010 | Ruprecht et al. ............. 192/54.5 |
| 2008/0029332 A1 * | 2/2008 | Gokan et al. ............... 192/70.23 |

FOREIGN PATENT DOCUMENTS

JP    2006-064157    3/2006

* cited by examiner

*Primary Examiner* — David D Le
*Assistant Examiner* — Jacob S Scott
(74) *Attorney, Agent, or Firm* — Alleman Hall McCoy Russell & Tuttle LLP

(57) ABSTRACT

A friction clutch includes a clutch cam which is movable with respect to a clutch hub in a center axis direction of a transmission shaft. The clutch cam has a release rod which penetrates through the clutch hub and is extended toward the pressure plate. An adjustment bolt which is provided at the pressure plate and is configured to restrict a moving range of a clutch cam in the center axis direction is disposed to face an end portion of the release rod which is closer to the pressure plate.

11 Claims, 5 Drawing Sheets

BACK TORQUE REDUCING DEVICE OF A FRICTION CLUTCH AND MOTORCYCLE COMPRISING THE SAME

TECHNICAL FIELD

The present invention relates to a back torque reducing device configured to reduce a back torque transmitted from a wheel side to a crankshaft side of an engine, in a friction clutch built into a motorcycle or the like.

BACKGROUND ART

Some vehicles, such as a motorcycle, are provided with a friction clutch between a crankshaft of an engine and a transmission shaft of a transmission which is coupled to a wheel. The friction clutch is configured to cause a drive plate which is rotatable integrally with the crankshaft and a driven plate which is rotatable integrally with the transmission shaft to contact each other, thereby transmitting rotation of the crankshaft to the wheel via the transmission, and to cause the drive plate and the driven plate to be away from each other so as not to transmit the rotation.

In a deceleration state resulting from gear downshifting during driving, a torque generated in the wheel coupled to the transmission is transmitted to the engine via the friction clutch. This torque is named a back torque. The friction clutch is provided with a back torque reducing device to prevent the back torque from being transmitted to the engine or to reduce the back torque being transmitted.

For example, in a back torque reducing device disclosed in Japanese Laid-Open Patent Application Publication NO. 2006-64157, a clutch cam is disposed at an opposite side, with respect to a clutch hub, from a pressure plate. A pin for adjusting a moving range of the clutch cam extends from the pressure plate into a clutch outer part and is inserted into a hole provided in a clutch hub such that a tip end faces the clutch cam.

In the friction clutch including the back torque reducing device disclosed in the above patent document 1, it is not easy to mount the pressure plate to the transmission shaft. It is necessary to mount the pressure plate to the transmission shaft with the clutch hub attached, in such a way that the pressure plate is coaxial with the transmission shaft while inserting the pin into the hole of the clutch hub.

Since it is difficult to see the hole of the clutch hub which is covered with the pressure plate when mounting the pressure plate to the transmission shaft, it is difficult to insert the pin into the hole.

In a motorcycle in which the transmission shaft is typically provided to extend along a horizontal direction, it is necessary to adjust the position of the transmission shaft around the center axis and to align the position of the pin and the position of the hole while carrying the pressure plate correctly in the center axis direction of the transmission shaft. This makes it more difficult to mount the pressure plate to the transmission shaft.

Furthermore, in the above configuration, it is necessary to form in the pressure plate the hole into which the pin is inserted and to form in the clutch hub the hole into which the pin is inserted such that they are coaxial with high accuracy. Therefore, a demand for processing accuracy increases to a comparatively high level. As a result, it is difficult to improve productivity and to reduce manufacturing cost.

Accordingly, an object of the present invention is to provide a back torque reducing device of a friction clutch which can be easily assembled and can improve its productivity.

SUMMARY OF THE INVENTION

The present invention addresses the above described conditions, and a back torque reducing device of a friction clutch of the present invention comprises a pressure plate configured to cause a drive plate, which is engageable with a clutch outer part to which rotation of a crankshaft is transmitted, and a driven plate, which is engageable with a clutch hub and is rotatable integrally with the clutch hub, to contact each other with a pressure; a clutch cam movable with respect to the clutch hub along a center axis direction of a transmission shaft; and a contact member provided at the pressure plate and configured to contact the clutch cam; wherein the clutch cam is configured to move toward the pressure plate along the center axis direction when a back torque is applied to the transmission shaft and press the contact member to cause the drive plate and the driven plate to be away from each other; and wherein the clutch cam has an extended portion with an end extending closer to the pressure plate than the clutch hub, and the contact member is disposed to face the end of the extended portion which is closer to the pressure plate.

In such a configuration, the contact member has only to be disposed to face the extended portion, and when mounting the pressure plate to the transmission shaft a precise position alignment of the contact member and the clutch hub is not necessary. This improves efficiency of an assembly process. Since the contact member is disposed to face the extended portion which is extended closer to the pressure plate than the clutch hub, it is not necessary to cause the contact member to penetrate through the clutch hub, and to form through-holes in the pressure plate and the clutch hub such that their positions are precisely aligned. Therefore, productivity can be improved.

The above and further objects and features of the invention will more fully be apparent from the following detailed description with accompanying drawings.

DETAILED DESCRIPTION OF THE EMBODIMENTS

Hereinafter, a back torque reducing device of a friction clutch according to the present invention will be described with reference to the drawings. By way of example, a motorcycle including the back torque reducing device will be described.

Figure 1:
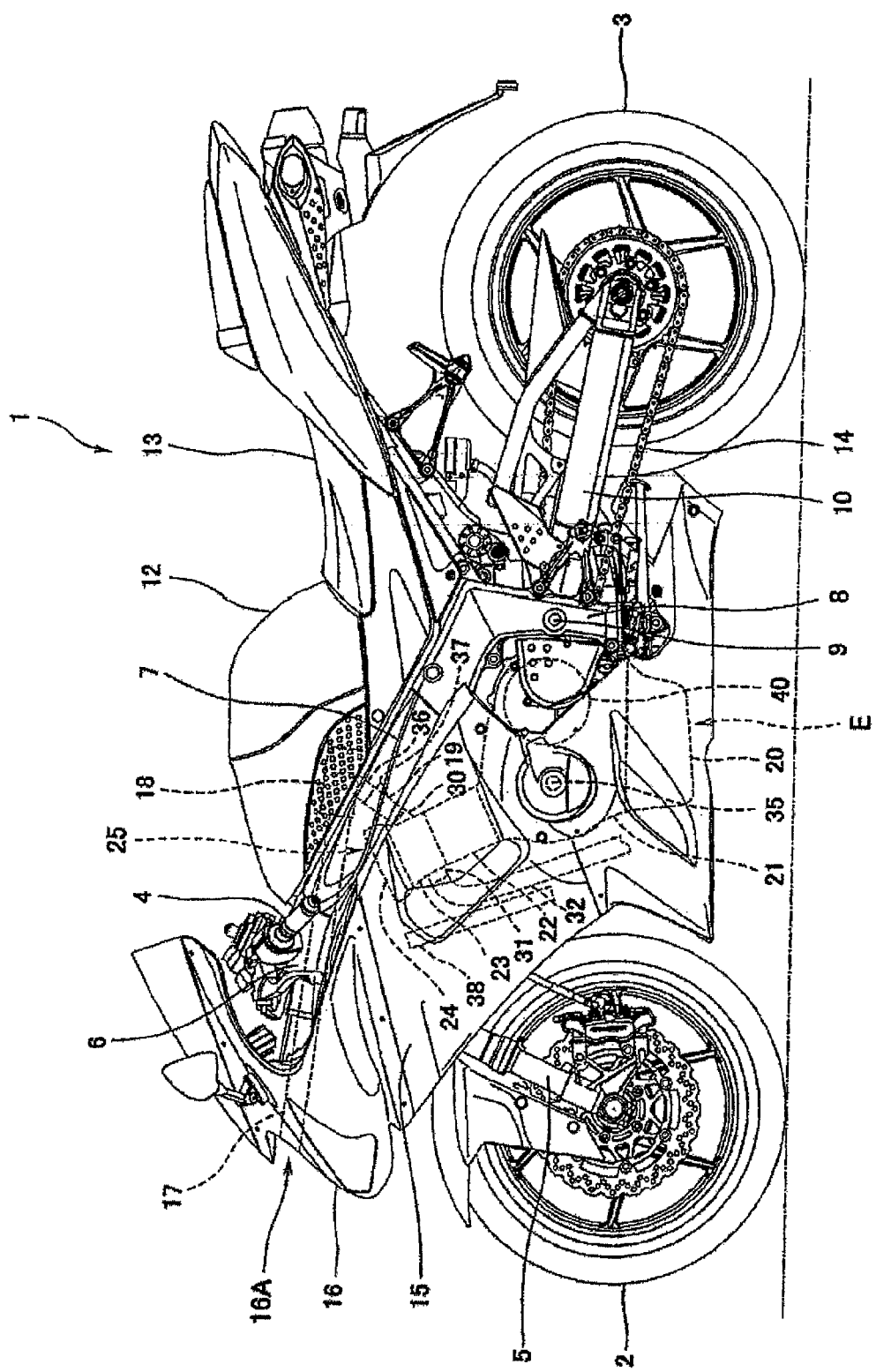
FIG. 1 is a side view of a motorcycle including a back torque reducing device of a friction clutch according to an embodiment.

[Motorcycle] FIG. 1 is a side view of a motorcycle 1 including the back torque reducing device of the friction clutch according to an embodiment. As used herein, the direction used in embodiments described below is such that a driving direction of the motorcycle 1 is forward and the other directions are referenced from a rider (not shown) mounting the motorcycle 1.

As shown in FIG. 1, the motorcycle 1 includes a front wheel 2 and a rear wheel 3. The front wheel 2 is rotatably mounted to a lower portion of a front fork 5 extending substantially vertically. The front fork 5 is mounted to a steering shaft (not shown) by an upper bracket (not shown) provided at an upper end portion thereof and an under bracket provided under the upper bracket. The steering shaft is rotatably mounted by a head pipe 6. A bar-type steering handle 4 extending rightward and leftward is mounted to the upper bracket. By the rider's operation for rotating the steering handle 4, the front wheel 2 can be rotated in a desired direction around the steering shaft.

The motorcycle 1 has a so-called twin-tube type frame. A pair of right and left main frame members 7 extend rearward from the head pipe 6 (In FIG. 1, only the left main frame member 7 is illustrated). A pivot frame member (also referred to as a swing arm bracket) 8 extends downward from a rear portion of each of the main frame members 7. A swing arm 10 is mounted at a front end portion thereof to a pivot 9 provided at the pivot frame member 8. The rear wheel 3 is rotatably mounted to a rear end portion of the swing arm 10.

A fuel tank 12 is disposed above the main frame members 7 and behind the steering handle 4. A straddle-type seat 13 is disposed behind the fuel tank 12. An engine E indicated by a broken line of FIG. 1 is mounted below and between the right and left main frame members 7. A cowling 15 covers the lateral side portions of the engine E. The engine E is an inline four-cylinder four-cycle engine. The center axis of a crankshaft 35 extends in a lateral direction of a vehicle body. A driving power of the engine E is transmitted to the rear wheel 3 via a chain 14. The rear wheel 3 rotates, enabling a propulsive force to be generated in the motorcycle 1.

The engine E includes as major components, an oil pan 20, a crankcase 21, a cylinder block 22, a cylinder head 23, and a cylinder head cover 24 which are arranged in this order from below. A cylinder 25 including the cylinder block 22, the cylinder head 23, and the cylinder head cover 24 is tilted forward with respect to a vertical direction in a vehicle body.

An air-intake inlet 16A is formed in a front cowling 16 (part of cowling 15) at a front part of the vehicle body. An air-intake duct 17 extends rearward from the air-intake inlet 16A. A downstream end portion of the air-intake duct 17 is coupled to an air cleaner box 18 in a location below the fuel tank 12. An air-intake pipe 19 extends downward from the air cleaner box 18. A downstream end portion of the air-intake pipe 19 is coupled to an intake port 30 formed in a rear portion of the cylinder head 23. A throttle body 36 is provided between the air cleaner box 18 and the air-intake pipe 19. A fuel injection device 37 is provided at a lower portion in an intermediate position of the air-intake pipe 19 to inject (mix) a fuel into intake-air.

An exhaust pipe 32 is coupled to an exhaust port 31 and extends downward from a front portion of the cylinder head 23. The exhaust pipe 32 extends through a region below the crankcase 21 and is coupled to a rear muffler (not shown). A radiator 38 is disposed in a space in front of the cylinder head 23 and in front of the exhaust pipe 32, to air-cool cooling water flowing in a wall portion of the engine E.

In the engine E configured as described above, a transmission (not shown) is accommodated in a rear portion of the crankcase 21, and a friction clutch 40 (indicated by a broken line) is provided at a right lateral side (rear side in FIG. 1) of the transmission. Hereinafter, the friction clutch 40 will be described.

Figure 2:
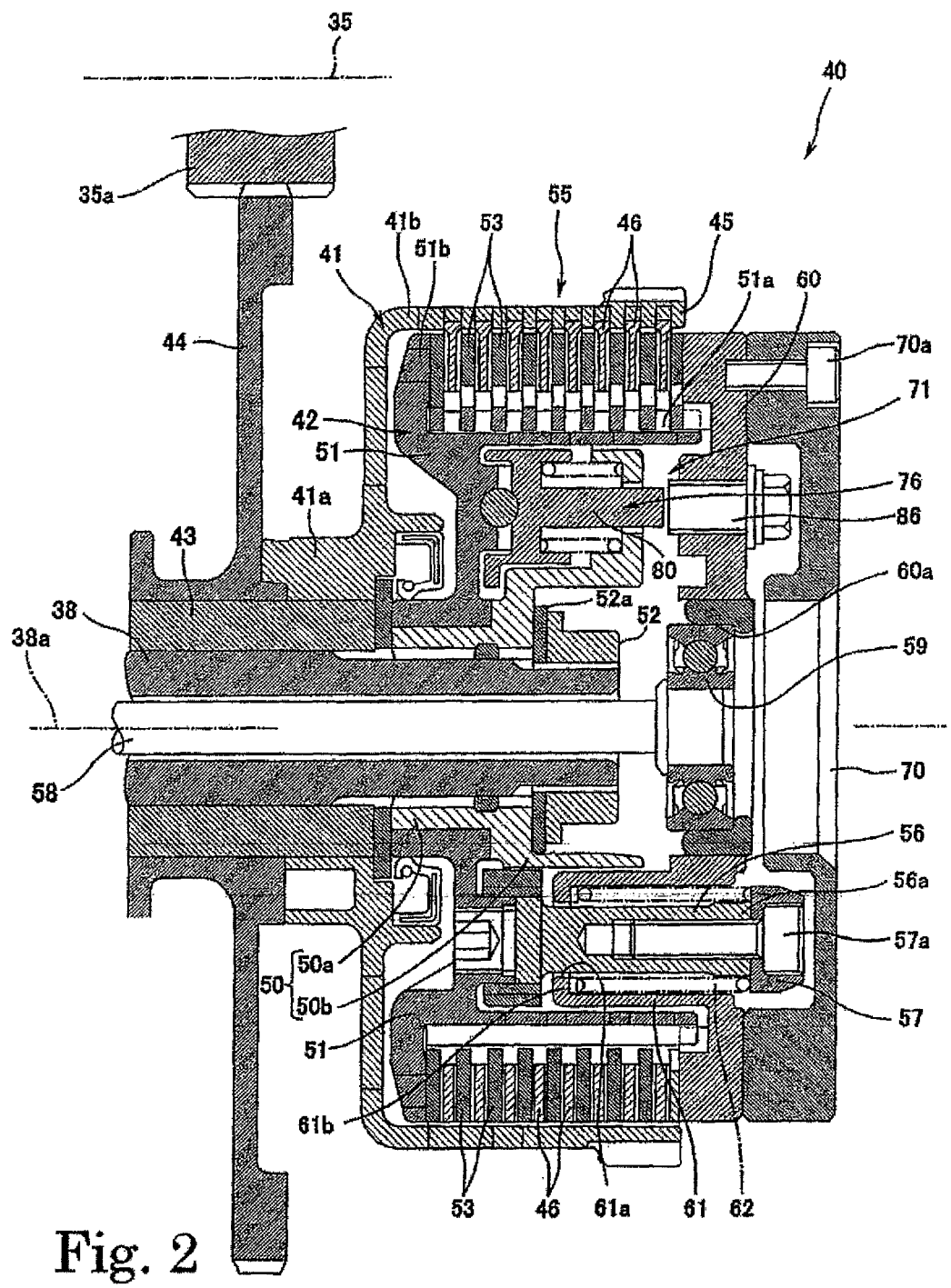
FIG. 2 is a cross-sectional view showing a configuration of the friction clutch.

[Friction clutch] FIG. 2 is a cross-sectional view showing a configuration of the friction clutch 40. As shown in FIG. 1, in a driving power transmission path extending from the engine E to the rear wheel 3, the friction clutch 40 is disposed between the crankshaft 35 and a transmission shaft 38 which is included in the transmission (not shown) and is disposed such that a center axis 38a extends in parallel with the crankshaft 35 and in a substantially horizontal direction, as shown in FIG. 2. The friction clutch 40 includes a clutch outer part 41 which is rotatable in association with the crankshaft 35 such that the rotation of the crankshaft 35 is transmitted to the clutch outer part 41 by gear drive, and a clutch hub 42 which is rotatable integrally with the transmission shaft 38.

The clutch outer part 41 has a stepped cylindrical shape and includes a small-diameter portion 41a and a large-diameter portion 41b. The small-diameter portion 41a is located inward (leftward and closer to the transmission) relative to the large-diameter portion 41b. The transmission shaft 38 is inserted into an inner hole of the small-diameter portion 41a such that the transmission shaft 38 is rotatable via a bearing 43. A clutch gear 44 is coaxially coupled to a left side end portion of the small-diameter portion 41a and is configured to mesh with an output gear 35a of the crankshaft 35. According to the rotation of the crankshaft 35, the clutch outer 41 is rotatable integrally with the clutch gear 44 around the transmission shaft 38.

A plurality of fingers 45 are provided at the large-diameter portion 41b of the clutch outer 41 to extend outward along the center axis 38a. The plurality of fingers 45 are arranged along the circumference direction of the large-diameter portion 41b such that they are equally spaced apart from each other. Drive plates 46 engage with the fingers 45. In more detail, in this embodiment, the plural drive plates 46, of a circular disc shape, are disposed inward of the large-diameter portion 41b, are arranged along the direction of the center axis 38a, and are supported by the fingers 45. The drive plates 46 are rotatable integrally with the fingers 45 around the center axis 38a, and are movable within a predetermined range in the direction along the center axis 38a.

The clutch hub 42 includes a stepped cylindrical inner part 50 having a small-diameter portion 50a and a large-diameter portion 50b, and a bottomed cylindrical hub body 51. The hub body 51 is provided with a through-hole in a center of a bottom portion thereof. The small-diameter portion 50a of the inner part 50 is internally fitted into the through-hole, enabling the inner 50 and the hub body 51 to be rotatable relatively around the center axis 38a. (It should be noted that the rotation is restricted within a specified range by a back torque reducing device 71 as described later.) In a state where the clutch hub 42 is accommodated in the large-diameter portion 41b of the clutch outer part 41, the small-diameter portion 50a of the inner part 50 and the transmission shaft 38 inserted into the small-diameter portion 50a are spline-coupled, and the clutch hub 42 is fastened by a lock nut 52 and a washer 52a threaded at the end portion of the transmission shaft 38. Therefore, the clutch hub 42 is unmovable around the center axis 38a and in the direction along the center axis 38a with respect to the transmission shaft 38 and is rotatable integrally with the transmission shaft 38.

As shown in FIG. 2, driven plates 53 engage with the hub body 51 of the clutch hub 42 such that the driven plates 53 are rotatable integrally with the hub body 51. To be more specific, in the hub body 51 of this embodiment, a spline is formed on an outer peripheral portion 51a thereof, and the plural driven plates 53 of a circular disc shape are arranged in the direction of the center axis 38a and are externally fitted to and supported by the hub body 51. These driven plates 53 are rotatable integrally with the clutch hub 42 around the center axis 38a and are movable within a predetermined range in the direction along the center axis 38a. The driven plates 53 and the plural drive plates 46 supported by the clutch outer part 41 are disposed alternately in the direction along the center axis 38a. An inner end, along the direction of the center axis 38a, of a friction plate group 55 formed by the plates 46 and 53 is configured to contact a flange portion 51b protruding radially outward from the outer peripheral portion 51a of the hub body 51, and an outer end thereof is configured to contact the pressure plate 60.

The pressure plate 60 has a circular disc shape having a through-hole 60a in a center portion thereof. The pressure plate 60 is provided so as to close the opening end of the clutch outer part 41. A clutch cover 70 is provided over an outside of the pressure plate 60 so as to cover substantially the entire pressure plate 60 as viewed from the side. A plurality of cylindrical spring accommodating tubes 61 are provided at the pressure plate 60 to protrude inward along the direction of the center axis 38a in concentric locations which are apart a predetermined dimension from a center of the pressure plate 60. A flange portion 61b extends radially inward from an inner opening end 61a of each spring accommodating tube 61 and a coil clutch spring 62 is accommodated in each spring accommodating tube 61 such that one end thereof is in contact with the flange portion 61b.

Plural rod-shaped spring holders 56 are provided in the hub body 51 included in the clutch hub 42 so as to respectively correspond to the spring accommodating tubes 61. The spring holders 56 extend outward from the hub body 51 along the direction of the center axis 38a. To be specific, each spring holder 56 extends from the inner opening end 61a of the spring accommodating tube 61, extends through the inside of the spring accommodating tube 61, extends through the inside of the clutch spring 62 and a tip end portion 56a thereof reaches the outer surface of the pressure plate 60. A stopper 57 is fastened to the tip end portion 56a by a bolt 57a. The stopper 57 protrudes radially outward in a larger amount than the peripheral surface of the tip end portion 56a of the spring holder 56. An opposite end of the clutch spring 62 is in contact with the stopper 57.

One end of the clutch spring 62 is in contact with the flange portion 61b of the spring accommodating tube 61 of the pressure plate 60, and an opposite end thereof is in contact with the stopper 57 of the spring holder 56 of the clutch hub 42. The clutch spring 62 is in a contracted state. The pressure plate 60 is subjected to an inward force in the direction of the center axis 38a by the clutch spring 62 which is going to extend, whereas the clutch hub 42 is unable to move along the direction of the center axis 38a. As a result, the pressure plate 60 presses the friction plate group 55 inward along the direction of the center axis 38a, causing the drive plates 46 and the driven plates 53 to contact each other with a pressure, so that the friction clutch 40 is in an engagement state. In this state, since the plates 46 and 53 rotate integrally, the rotation is transmitted from the crankshaft 35 to the transmission shaft 38 via the friction clutch 40.

The transmission shaft 38 has a hollow pipe shape. A push rod 58 is inserted into the transmission shaft 38. One end portion of the push rod 58 is coupled to a clutch disengagement mechanism, which is not shown, and an opposite end portion thereof is coupled to the pressure plate 60 by a bearing 59 provided in the through-hole 60a at the center portion of the pressure plate 60. When the rider operates a clutch lever (not shown), the clutch disengagement mechanism is activated, so that the push rod 58 presses the pressure plate 60 in an outward direction (rightward direction in FIG. 2) along the direction of the center axis 38a. Thereby, the pressing force for causing the drive plates 46 and the driven plates 53 to contact each other with a pressure is reduced, and thus the friction clutch 40 is turned to a disengagement state. As a result, the rotation of the crankshaft 53 is not transmitted to the transmission shaft 38.

Figure 3:
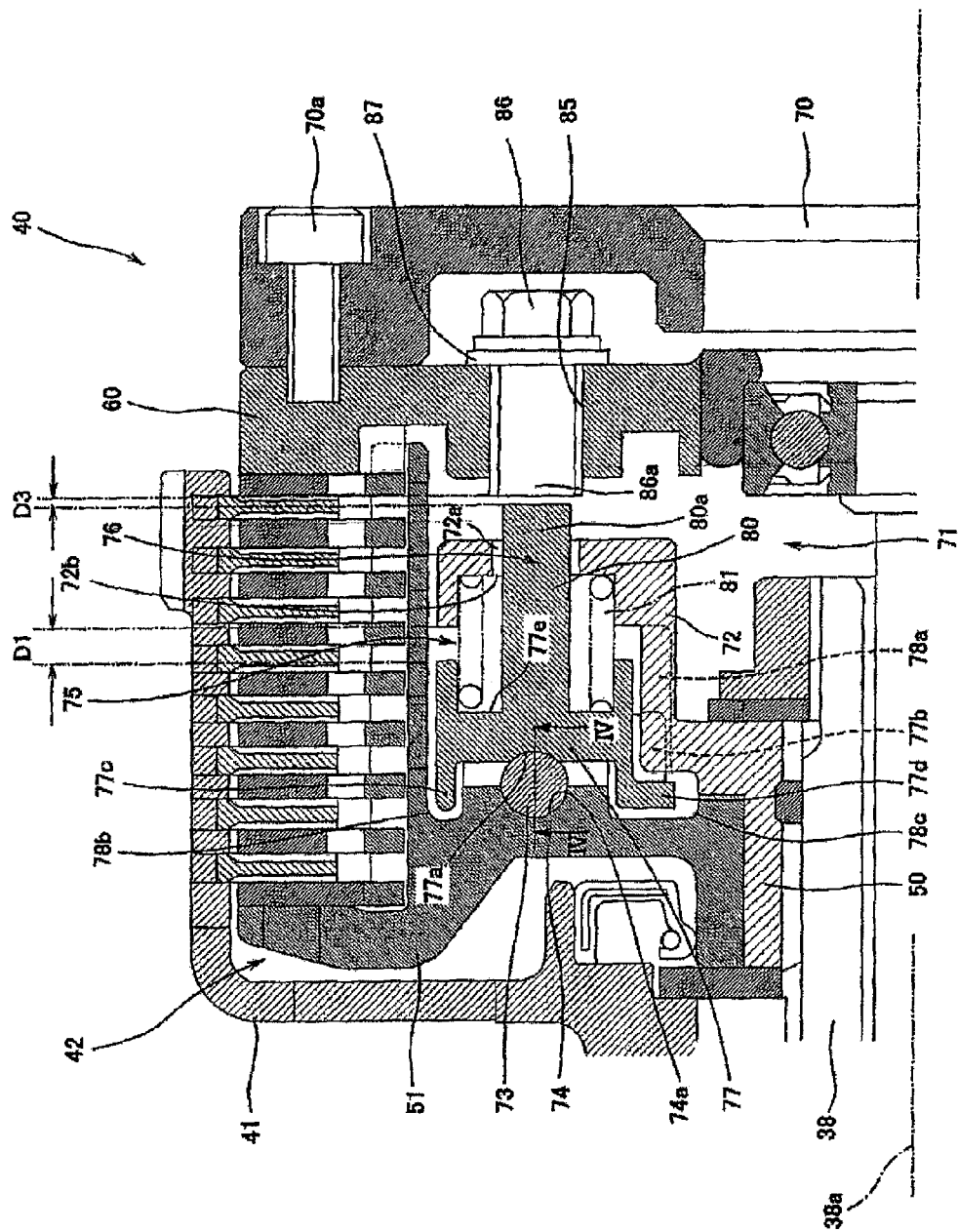
FIG. 3 is a partial enlarged view of the friction clutch of FIG. 2, mainly showing a configuration of a back torque reducing device included in the friction clutch.

[Back torque reducing device] FIG. 3 is a partially enlarged view of the friction clutch 40 of FIG. 2, mainly showing a configuration of the back torque reducing device 71 included in the friction clutch 40. As shown in FIG. 3, the inner part 50 of the clutch hub 42 is provided with bottomed tubular portions 72 which open inward along the direction of the center axis 38a. The plurality (e.g., three) of bottomed tubular portions 72 are provided at the outer peripheral portion of the inner part 50 such that they are equally spaced apart from each other. Hub ball contact portions 74 are formed on the outer peripheral portion of the hub body 51 in locations respectively corresponding to the bottomed tubular portions 72 and are configured to contact steel balls 73 which are spherical elements made of steel. And, the bottomed tubular portions 72 and the hub ball contact portions 74 form cam spaces 75.

Clutch cams 76 are respectively accommodated in the cam spaces 75. Each clutch cam 76 has a cam ball contact portion 77 disposed to face the hub ball contact portion 74. Cam grooves 74a and 77a are respectively formed on the hub ball contact portion 74 and the cam ball contact portion 77 to allow the steel ball 73 to be partially fitted thereinto such that the cam grooves 74a and 77a have a circular-arc shape having a short length around the center axis 38a.

Figure 4:
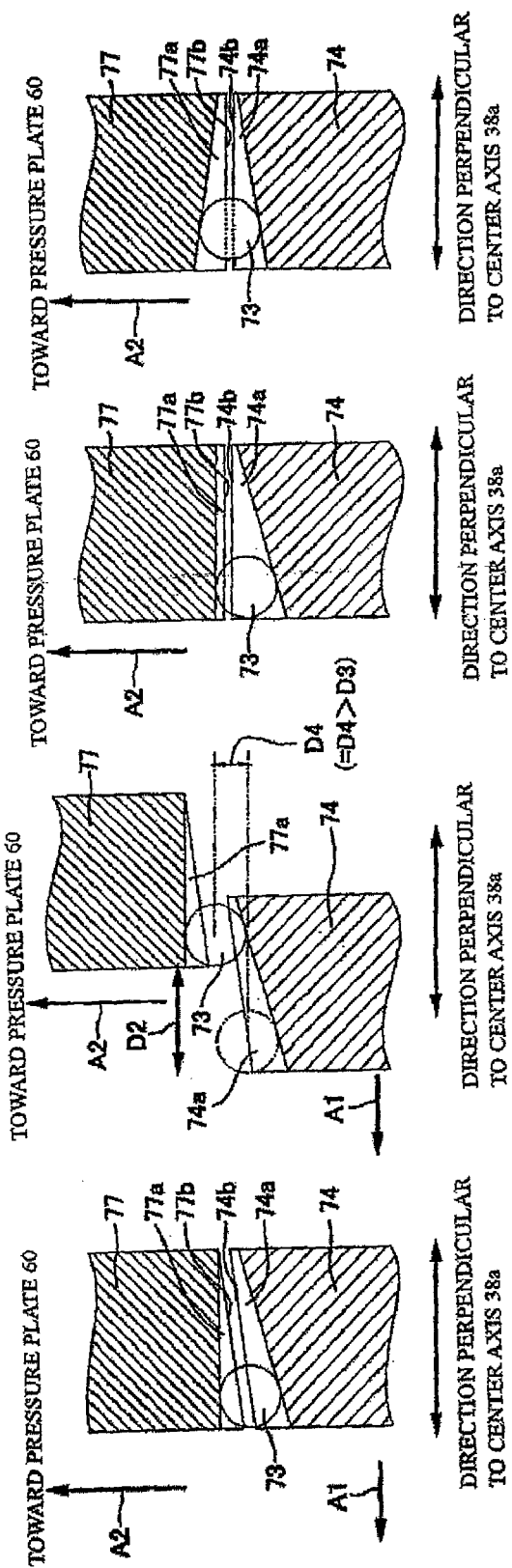
FIG. 4(a) is a cross-sectional view of the back torque reducing device of FIG. 3, taken along line IV-IV, showing an example of a configuration of a steel ball and a region surrounding the steel ball.
FIG. 4(b) is an operation view of the configuration of FIG. 4(a).
FIG. 4(c) is a cross-sectional view showing another example of a back torque reducing device of FIG. 3.
FIG. 4(d) is a cross-sectional view showing another example of a back torque reducing device of FIG. 3.

FIG. 4 is a schematic view of the back torque reducing device 71 of FIG. 3, showing the cross-section taken along line IV-IV. FIG. 4(a) is an example of the configuration of the steel ball 73 and a region surrounding the steel ball 73. FIG. 4(b) is an operation view of FIG. 4(a). FIGS. 4(c) and 4(d) show other examples of the configuration. As shown in FIG. 4(a), a surface 74b of the hub ball contact portion 74 and a surface 77b of the cam ball contact portion 77 which face each other are parallel such that they are tilted with an equal tilting angle in the direction (see double-tipped arrow in FIG. 4) substantially perpendicular to the center axis 38a. The cam groove 74a of the hub ball contact portion 74 and the cam groove 77a of the cam ball contact portion 77 are formed such that a depth from the surface 74b and a depth from the surface 77b are smaller, in the direction from one side toward the other side in the circumferential direction around the center axis 38a; to be precise, toward the direction opposite to the direction (direction of arrow A1 in FIG. 4(a)) of the force applied on the hub ball contact portion 74 when the back torque is generated. In the state shown in FIG. 4(a), the steel ball 73 is located in deepest regions of the cam grooves 74a and 77a.

When the hub body 51 rotates in the circumferential direction (direction of arrow A1) around the center axis 38a with respect to the inner 50 from the state of FIG. 4(a) to the state of FIG. 4(b), the steel ball 73 moves from the deepest region toward a shallower region in the cam groove 74a of the hub ball contact portion 74. As a result, the steel ball 73 is pressed toward the cam ball contact portion 77 (toward the clutch cam 76), and the clutch cam 76 moves toward the pressure plate 60 (direction of arrow A2).

Instead of the above described configuration, a configuration shown in FIG. 4(c) or 4(d) may be used. The difference between the configuration of FIG. 4(a) and the configuration of FIG. 4(c) will be described. In the configuration of FIG. 4(c), the surface 74b of the hub ball contact portion 74 and the surface 77b of the cam ball contact portion 77 which face each other are substantially parallel with respect to the direction (double-tipped arrow in the figure) perpendicular to the center axis 38a. Only the cam groove 74a is formed to have a depth which decreases toward the direction opposite to the direction (direction of arrow A1 in FIG. 4(a)) in which a force is applied to the hub ball contact portion 74 when the back torque is generated, while the depth of the cam groove 77a is substantially uniform. In such a configuration, when the hub body 51 rotates, the clutch cam 76 moves toward the pressure plate 60.

In the configuration of FIG. 4(d), the surface 74b of the hub ball contact portion 74 and the surface 77b of the cam ball contact portion 77 which face each other are substantially parallel with respect to the direction (double-tipped arrow in the figure) perpendicular to the center axis 38a, as in the configuration of FIG. 4(c). In contrast, the cam groove 74a and the cam groove 77a are formed such that a depth from the surface 74b and a depth from the surface 77b are smaller toward the direction opposite to the direction (direction of arrow A1 in FIG. 4(a)) of the force applied to the hub ball contact portion 74 when the back torque is generated, as in the configuration of FIG. 4(a). In such a configuration, when the hub body 51 rotates, the clutch cam 76 moves toward the pressure plate 60.

The configurations shown in FIGS. 4(a) to 4(d) are identical in that a return spring 81 forming a biasing means applies a force to cause the hub body 51 and the clutch cam 76 to be closer to each other, and the steel ball 73 forming a "rolling element" is disposed in a gap formed between the hub body 51 and the clutch cam 76. The gap decreases in dimension toward the direction opposite to the direction in which the force is applied to the hub body 51 when the back torque is generated. When the back torque is actually generated, the steel ball 73 pushes out the clutch cam 76 toward the pressure plate 60 according to the relative movement of the hub body 51 and the clutch cam 76. Having illustrated in the above description the steel ball 73 which is the spherical element as the element forming the "rolling element," a roller (e.g., taper roller) or the like may alternatively be used.

As shown in FIG. 3, a first guide plate 77b is provided at an end portion of the ball contact portion 77 which is closer to the center axis 38a so as to extend closer to the center axis 38a along the radial direction around the center axis 38a, while a second guide plate 77c is provided at an end portion of the ball contact portion 77 which is away from the center axis 38a so as to extend along the direction of the center axis 38a (i.e., lateral direction). Further, a third guide plate 77d is provided at an inner end portion (left end portion) of the first guide plate 77b in the direction of the center axis 38a and forms a surface perpendicular to the first guide plate 77b.

The guide plates 77b, 77c, and 77d are disposed such that their surfaces are substantially perpendicular to each other. To be specific, the first guide plate 77b forms the surface extending along the radial direction around the center axis 38a, the second guide plate 77c forms the surface extending along the center axis 38a and in the direction substantially perpendicular to the radial direction, and a third guide plate 77d forms the surface extending in the direction substantially perpendicular to the radial direction and to the center axis 38a.

As shown in FIG. 3, a first guide groove 78a is formed on a wall portion of the bottomed tubular portion 72 of the inner part 50 which is closer to the center axis 38a, such that the first guide groove 78a is recessed in the direction from the cam space 75 toward the center axis 38a. The first guide plate 77b of the clutch cam 76 is inserted into the inner guide groove 78a so that the movement of the first guide plate 77b around the center axis 38a is restricted. In other words, the first guide plate 77b engages with the first guide groove 78a, enabling the inner 50 and the clutch cam 76 to rotate integrally around the center axis 38a.

A second guide groove 78b is formed at a portion of the hub body 51 which is more distant from the center axis 38a than a ball retaining portion 74 such that the second guide groove 78b is recessed inward (i.e., leftward) along the direction of the center axis 38a and extends in the circumferential direction around the center axis 38a. A portion of the second guide plate 77c of the clutch cam 76 which extends inward in the direction of the center axis 38a is inserted into the second guide groove 78b such that the radial movement of the portion around the center axis 38a is restricted and the circumferential movement of the portion around the center axis 38a is permitted within the dimension of the second guide groove 78b.

A third guide groove 78c is formed at a portion of the hub body 51 which is closer to the center axis 38a than the ball retaining portion 74 such that the third guide groove 78c is recessed inward (i.e., leftward) along the direction of the center axis 38a and extends in the circumferential direction around the center axis 38a. The third guide plate 77d of the clutch cam 76 is inserted into the third guide groove 78c. The third guide plate 77d is movable within the dimension of the third guide groove 78c in the circumferential direction around the center axis 38a in a state where the inner 50 and the hub body 51 are coupled to each other.

The relative movement of the inner 50, the hub body 51 and the clutch cam 76 in the state where the clutch cam 76 is accommodated in the cam space 75 will be described. The clutch cam 76 is movable within a predetermined dimension D1 (see FIG. 3) with respect to the inner 50 and the hub body 51 in the direction along the center axis 38a. The clutch cam 76 and the inner 50 are integrally rotatable around the center axis 38a with respect to the hub body 51 within a range of a distance equal to a predetermined relative movement dimension D2 (see FIG. 4(b)) between the hub ball contact portion 74 and the ball contact portion 77.

As shown in FIG. 3, the clutch cam 76 has a release rod 80 extending from the ball contact portion 77 to form an extended portion. The release rod 80 extends outward (i.e., direction toward the pressure plate 60) along the direction of the center axis 38a from a spring contact surface 77e on the opposite side of the ball contact portion 77 from the cam groove 77a. A tip end portion 80a of the release rod 80 protrudes closer to the pressure plate 60 than the inner part 50 of the clutch hub 42. To be more specific, the tip end portion 80a of the release rod 80 protrudes outside the cam space 75 through a hole 72a formed on the bottom portion of the bottomed tubular portion 72 so as to extend in the direction from the cam space 75 toward the pressure plate 60. The coil return spring 81 is accommodated in the cam space 75 and is wound around the release rod 80. The return spring 81 is disposed in a contracted state such that one end thereof is in contact with the spring contact surface 77e of the clutch cam 76 and an opposite end thereof is in contact with an inner bottom surface 72b of the bottomed tubular portion 72. Therefore, the clutch cam 76 is subjected to a force toward the ball retaining portion 74 (i.e., inward along the direction of the center axis 38a) of the hub body 51 from the return spring 81 which is going to extend.

A threaded hole 85 is formed on the pressure plate 60 in a location corresponding to the release rod 80. An adjustment bolt 86 forming a contact member is threaded into the threaded hole 85. A shim (metal stock) 87 of a circular disc shape is provided between the surface of the pressure plate 60 and a thread head of the adjustment bolt 86. By suitably selecting the thickness or number of the shim 87 and disposing it between the pressure plate 60 and the adjustment bolt 86, a distance D3 between a tip end portion 86a of the adjustment bolt 86 and the tip end portion 80a of the release rod 80 which faces the tip end portion 86a is adjustable.

In the back torque reducing device 71 as described above, while the motorcycle 1 is driving normally in the state where the friction clutch 40 is in an engagement state, the clutch cam 76 is pressed toward the hub body 51 by the force applied by the return spring 81 and the steel ball 73 interposed between them is located in the deepest regions of the cam grooves 74a and 77a as shown in FIG. 4(a). When gear downshifting is performed and the back torque is applied to the friction clutch 40, the inner part 50 and the hub body 51 of the clutch hub 42 rotate relatively around the center axis 38a due to the torque.

Thereby, the clutch cam 76 moves together with the inner part 50. As a result, a contact position of the cam groove 74a of the hub body 51 side and the steel ball 73 changes from the deepest region to the shallowest region, as shown in FIG. 4(b). According to the change, the clutch cam 76 moves away outward (i.e., toward the pressure plate 60) along the direction of the center axis 38a from the hub body 51 against the force of the return spring 81. As a result, the release rod 80 of the clutch cam 76 contacts the adjustment bolt 86 and presses the pressure plate 60, and the pressing force applied to the drive plates 46 and the driven plates 53 is reduced, causing the plates 46 and 53 to slip relatively. The friction clutch 40 is put into a "partial engagement state." Thus, when the back torque which is a predetermined torque or larger is generated because of the gear downshifting, the back torque reducing device 71 operates to cause the friction clutch 40 to be put into the partial engagement state so that a part of the driving power of the back torque is not transmitted toward the engine E. That is, the amount of the back torque to be transmitted is controlled (reduced).

To enable the back torque reducing device 71 to operate so that a part of the driving force of the back torque is not transmitted toward the engine E, the dimension D1 over which the clutch cam 76 is movable in the direction along the center axis 38a is set larger (see FIG. 3) than the distance D3 between the clutch cam 76 and the adjustment bolt 86 in the state where the friction clutch 40 is in an engagement state. As shown in FIG. 4(b), the distance D4 over which the clutch cam 76 is movable toward the pressure plate 60 with respect to the hub body 51, when the back torque has a value which must be transmitted in a limited manner toward the engine E, is set larger than the dimension D3. For example, the dimension D3 may be set larger than a value of zero and smaller than the distance D4 in the state where no back torque is applied.

Figure 5:
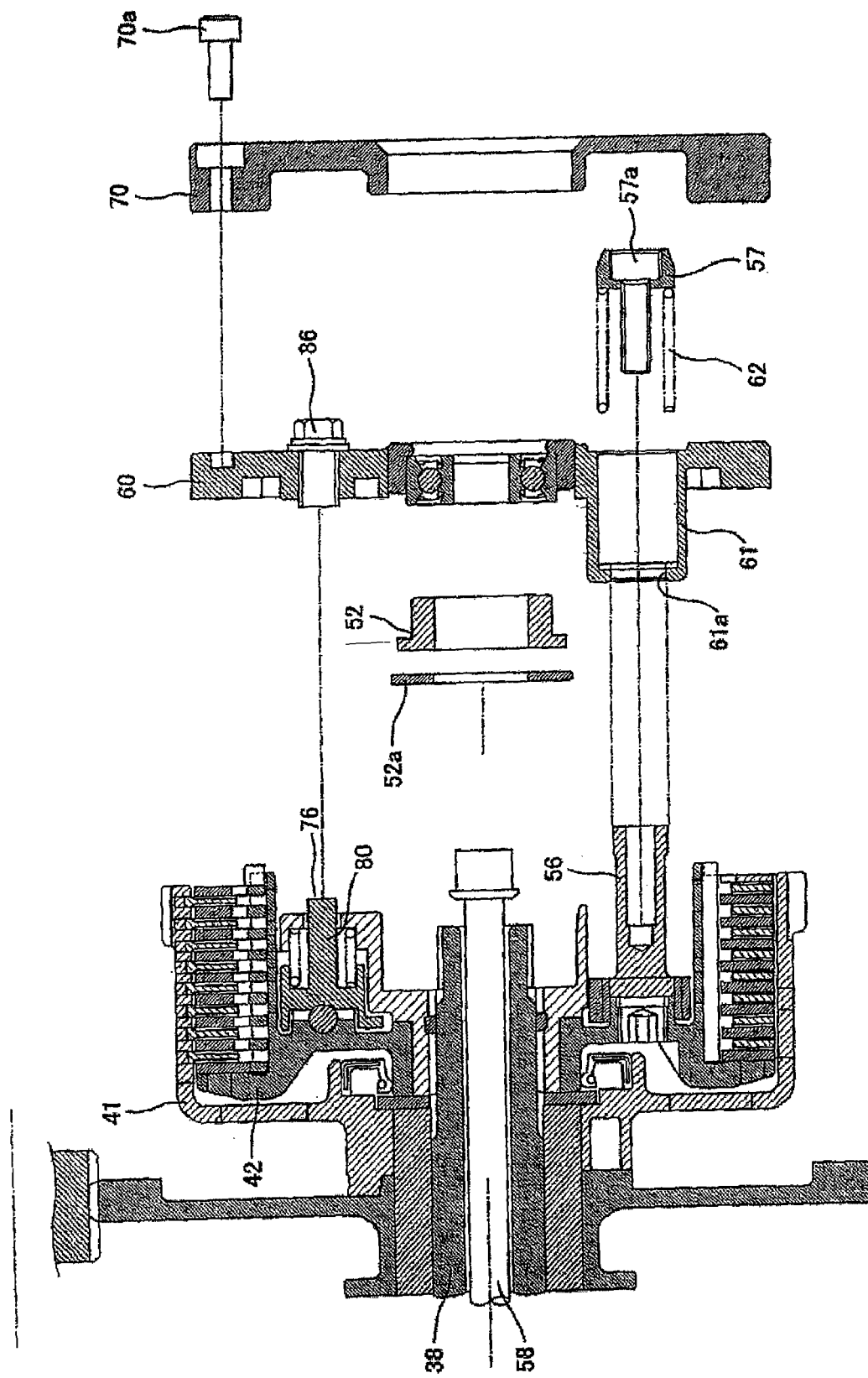
FIG. 5 is an exploded view of the friction clutch of FIG. 3.

FIG. 5 is an exploded view of the friction clutch 40 shown in FIG. 3. An assembly procedure of the above described friction clutch 40 will be described. In the state where the clutch outer part 41 is externally fitted to the transmission shaft 38, the clutch hub 42 is further externally fitted to the transmission shaft 38 and fastened by the lock nut 52 and the washer 52a. Then, while aligning the position of the spring holders 56 of the clutch hub 42 and the position of the opening ends 61a of the spring accommodating tubes 61, the pressure plate 60 is disposed to close the opening of the clutch outer 41 and is coupled to the end portion of the push rod 58. In this state, the adjustment bolt 86 provided at the pressure plate 60 is disposed to face the release rod 80. Then, the clutch spring 62 is accommodated into the spring accommodating tube 61 such that the clutch spring 62 is externally fitted to the spring holder 56, the stopper 57 is fastened by the bolt 57a, and the clutch cover 70 is provided to cover a substantially entire part of the pressure plate 60 and is fastened to the pressure plate 60 by a bolt 70a.

As should be appreciated from the above, in the friction clutch 40 according to this embodiment, it is not necessary to precisely align the position of the release rod 80 and the position of the adjustment bolt 86 in the assembly procedure, and mounting of the pressure plate 60 is easily carried out. In addition, when forming the bolt hole 85 and the hole 72a, it is not to necessary to precisely align the position of the bolt hole 85 of the pressure plate 60 into which the adjustment bolt 86 is threaded with the position of the hole 72a of the clutch hub 42 into which the release rod 80 is inserted.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A back torque reducing device of a friction clutch comprising:
    a pressure plate configured to cause a drive plate, which is engageable with a clutch outer part to which rotation of a crankshaft is transmitted, and a driven plate, which is engageable with a clutch hub and is rotatable integrally with the clutch hub, to contact each other with a pressure;
    a clutch cam movable with respect to the clutch hub along a center axis direction of a transmission shaft; and
    a contact member fastened to the pressure plate and configured to contact the clutch cam;
    wherein the clutch cam is configured to move toward the pressure plate along the center axis direction when a back torque is applied to the transmission shaft and press the contact member to cause the drive plate and the driven plate to be away from each other; and
    wherein the clutch cam has an extended portion with an end extending closer to the pressure plate than the clutch hub, and the contact member is disposed to face the end of the extended portion which is closer to the pressure plate.

2. The back torque reducing device of a friction clutch according to claim 1,
    wherein a distance is provided between the contact member and the extended portion of the clutch cam such that the distance is adjustable.

3. The back torque reducing device of a friction clutch according to claim 1,
    wherein a distance over which the clutch cam is movable toward the pressure plate along the center axis direction when a back torque is applied to the transmission shaft is set, in a state where no back torque is applied, larger than a distance between the contact member and the extended portion in the state where no back torque is applied.

4. A motorcycle comprising the back torque reducing device according to claim 1.

5. The back torque reducing device of a friction clutch according to claim 1, wherein the contact member is a bolt threaded into a threaded hole formed to penetrate the pressure plate, and a head portion of the bolt is located on an outer surface side of the pressure plate.

6. A back torque reducing device of a friction clutch comprising:
- a pressure plate configured to cause a drive plate, which is engageable with a clutch outer part to which rotation of a crankshaft is transmitted, and a driven plate, which is engageable with a clutch hub and is rotatable integrally with the clutch hub, to contact each other with a pressure;
- a clutch cam movable with respect to the clutch hub along a center axis direction of a transmission shaft; and
- a contact member provided at the pressure plate and configured to contact the clutch cam;
- wherein the clutch cam is configured to move toward the pressure plate along the center axis direction when a back torque is applied to the transmission shaft and press the contact member to cause the drive plate and the driven plate to be away from each other;
- wherein the clutch cam has an extended portion with an end extending closer to the pressure plate than the clutch hub, and the contact member is disposed to face the end of the extended portion which is closer to the pressure plate;
- wherein the clutch hub has a cam space for accommodating the clutch cam and a through-hole penetrating the clutch hub from the cam space toward the pressure plate; and
- wherein the extended portion of the clutch cam protrudes from the cam space toward the pressure plate through the through-hole.

7. A back torque reducing device of a friction clutch comprising:
- a pressure plate configured to cause a drive plate, which is engageable with a clutch outer part to which rotation of a crankshaft is transmitted, and a driven plate, which is engageable with a clutch hub and is rotatable integrally with the clutch hub, to contact each other with a pressure;
- a clutch cam movable with respect to the clutch hub along a center axis direction of a transmission shaft; and
- a contact member provided at the pressure plate and configured to contact the clutch cam;
- wherein the clutch cam is configured to move toward the pressure plate along the center axis direction when a back torque is applied to the transmission shaft and press the contact member to cause the drive plate and the driven plate to be away from each other;
- wherein the clutch cam has an extended portion with an end extending closer to the pressure plate than the clutch hub, and the contact member is disposed to face the end of the extended portion which is closer to the pressure plate;
- wherein the clutch hub has a hub ball contact portion and the clutch cam has a cam ball contact portion, the back torque reducing device further comprising:
- a spherical element disposed between the hub ball contact portion and the cam ball contact portion; and
- a biasing means configured to apply a force to cause the hub ball contact portion and the cam ball contact portion to be closer to each other;
- wherein the clutch hub and the clutch cam are configured to relatively move around the center axis and the clutch cam is configured to move away from the clutch hub toward the pressure plate against the force applied by the biasing means when the back torque is applied to the transmission shaft.

8. The back torque reducing device of a friction clutch according to claim 7,
- wherein at least one of a surface of the hub ball contact portion and a surface of the cam ball contact portion which face each other has a groove which has a depth decreasing in a direction opposite to a direction in which a force is applied to the clutch hub when the back torque is applied to the transmission shaft; and
- wherein the spherical element is fitted into the groove.

9. A back torque reducing device of a friction clutch comprising:
- a pressure plate configured to cause a drive plate, which is engageable with a clutch outer part to which rotation of a crankshaft is transmitted, and a driven plate, which is engageable with a clutch hub and is rotatable integrally with the clutch hub, to contact each other with a pressure;
- a clutch cam movable with respect to the clutch hub along a center axis direction of a transmission shaft; and
- a contact member provided at the pressure plate and configured to contact the clutch cam;
- wherein the clutch cam is configured to move toward the pressure plate along the center axis direction when a back torque is applied to the transmission shaft and press the contact member to cause the drive plate and the driven plate to be away from each other;
- wherein the clutch cam has an extended portion with an end extending closer to the pressure plate than the clutch hub, and the contact member is disposed to face the end of the extended portion which is closer to the pressure plate;
- wherein the clutch hub has a hub ball contact portion provided with a groove, the clutch cam has a cam ball contact portion provided with a groove, and a spherical element is provided between the groove of the hub ball contact portion and the groove of the cam ball contact portion and is configured to roll along the grooves;
- wherein a surface of the hub ball contact portion and a surface of the cam ball contact portion which face each other are parallel to each other and are tilted with a substantially equal angle with respect to a direction perpendicular to the center axis of the transmission shaft; and
- wherein the groove of the hub ball contact portion and the groove of the cam ball contact portion are respectively formed to have depths from the surfaces facing each other which decrease toward a direction opposite to a direction in which a force is applied to the hub ball contact portion when the back torque is generated.

10. A back torque reducing device of a friction clutch comprising:
- a pressure plate configured to cause a drive plate, which is engageable with a clutch outer part to which rotation of a crankshaft is transmitted, and a driven plate, which is engageable with a clutch hub and is rotatable integrally with the clutch hub, to contact each other with a pressure;
- a clutch cam movable with respect to the clutch hub along a center axis direction of a transmission shaft; and
- a contact member provided at the pressure plate and configured to contact the clutch cam;
- wherein the clutch cam is configured to move toward the pressure plate along the center axis direction when a back torque is applied to the transmission shaft and press the contact member to cause the drive plate and the driven plate to be away from each other;

wherein the clutch cam has an extended portion with an end extending closer to the pressure plate than the clutch hub, and the contact member is disposed to face the end of the extended portion which is closer to the pressure plate;

wherein the clutch hub has a hub ball contact portion provided with a groove, the clutch cam has a cam ball contact portion provided with a groove, and a spherical element is provided between the groove of the hub ball contact portion and the groove of the cam ball contact portion and is configured to roll along the grooves;

wherein a surface of the hub ball contact portion and a surface of the cam ball contact portion which face each other are parallel to each other and are substantially parallel with respect to a direction perpendicular to the center axis of the transmission shaft; and wherein only the groove of the hub ball contact portion is formed to have a depth from the surface thereof facing the surface of the cam ball contact portion which decreases toward a direction opposite to a direction in which a force is applied to the hub ball contact portion when the back torque is generated.

11. A back torque reducing device of a friction clutch comprising:

a pressure plate configured to cause a drive plate, which is engageable with a clutch outer part to which rotation of a crankshaft is transmitted, and a driven plate, which is engageable with a clutch hub and is rotatable integrally with the clutch hub, to contact each other with a pressure;

a clutch cam movable with respect to the clutch hub along a center axis direction of a transmission shaft; and a contact member provided at the pressure plate and configured to contact the clutch cam;

wherein the clutch cam is configured to move toward the pressure plate along the center axis direction when a back torque is applied to the transmission shaft and press the contact member to cause the drive plate and the driven plate to be away from each other;

wherein the clutch cam has an extended portion with an end extending closer to the pressure plate than the clutch hub, and the contact member is disposed to face the end of the extended portion which is closer to the pressure plate;

wherein the clutch hub has a hub ball contact portion provided with a groove, the clutch cam has a cam ball contact portion provided with a groove, and a spherical element is provided between the groove of the hub ball contact portion and the groove of the cam ball contact portion and is configured to roll along the grooves;

wherein a surface of the hub ball contact portion and a surface of the cam ball contact portion which face each other are parallel to each other and are substantially parallel with respect to a direction perpendicular to a center axis of the transmission shaft; and wherein the groove of the hub ball contact portion and the groove of the cam ball contact portion are respectively formed to have depths from the surfaces facing each other which decrease toward a direction opposite to a direction in which a force is applied to the hub ball contact portion when a back torque is generated.

* * * * *